Feb. 24, 1959 W. SCHIEBEL 2,874,880
SPREADER DEVICE
Filed June 20. 1957 2 Sheets-Sheet 1
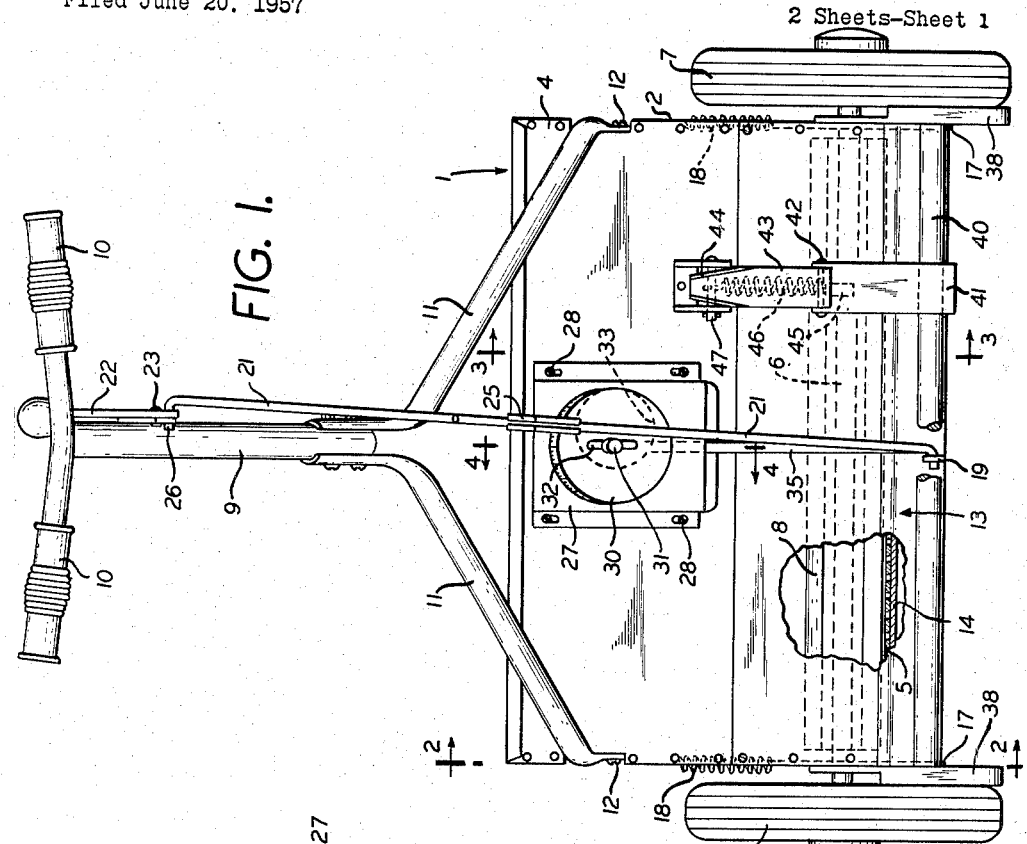
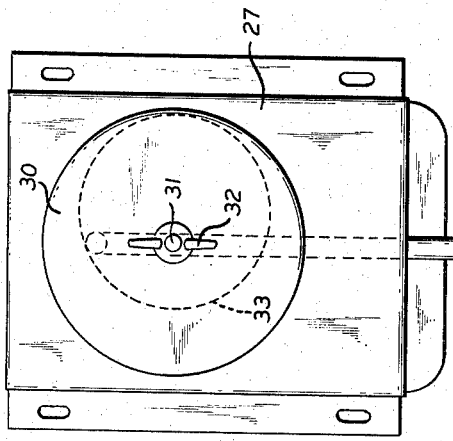
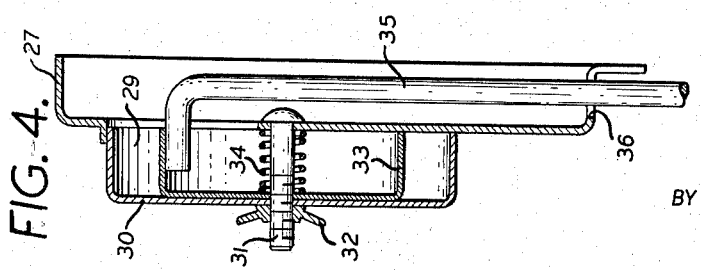
INVENTOR
WILLIAM SCHIEBEL
BY
ATTORNEY.

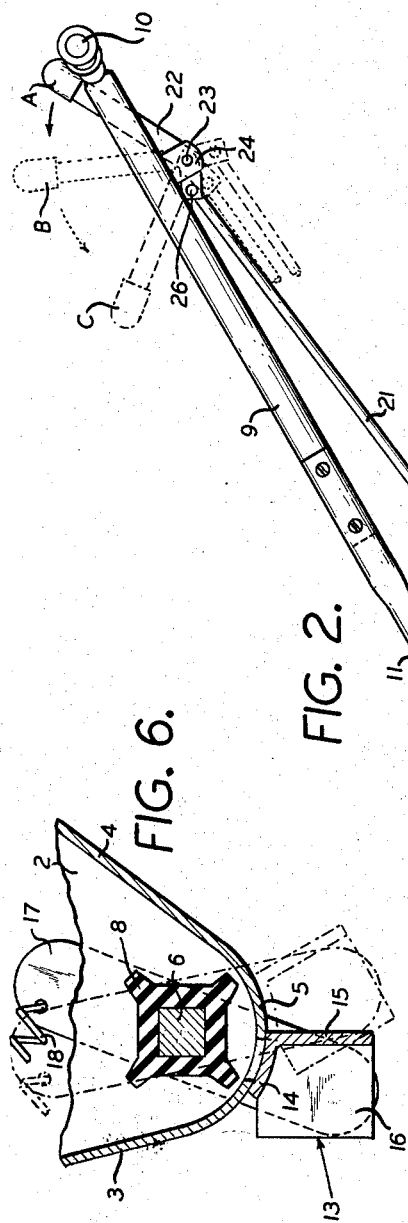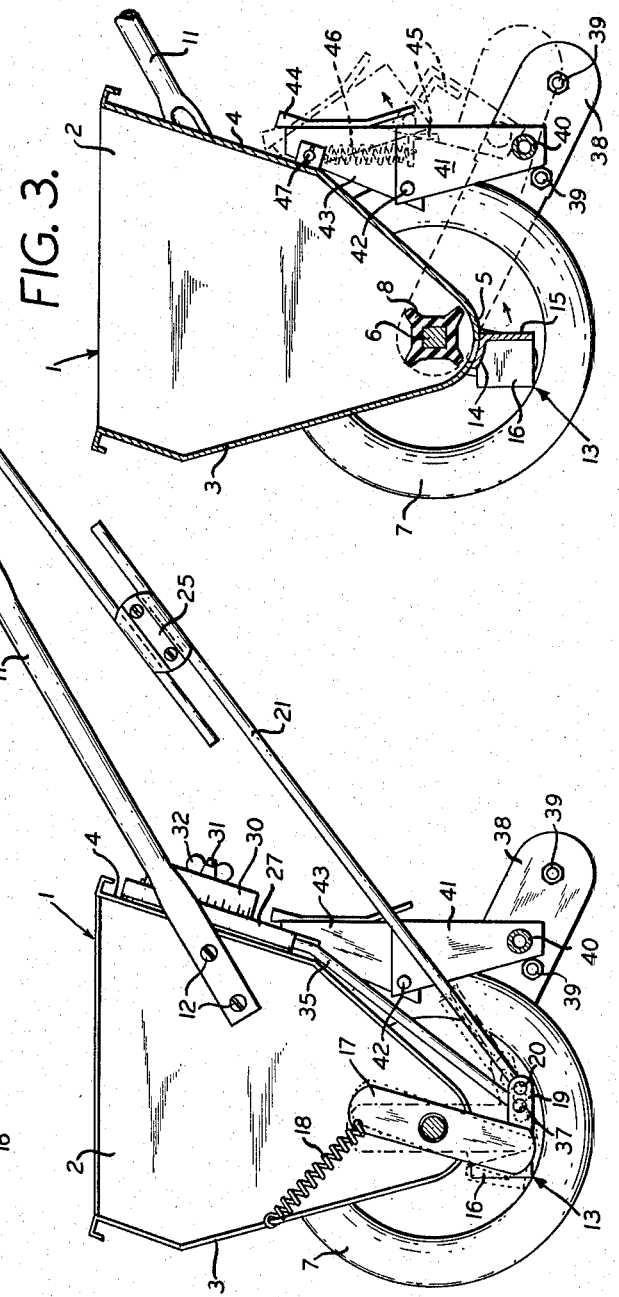

United States Patent Office 2,874,880
Patented Feb. 24, 1959

2,874,880

SPREADER DEVICE

William Schiebel, East Stroudsburg, Pa.

Application June 20, 1957, Serial No. 666,946

2 Claims. (Cl. 222—177)

The present invention relates to a spreader device to be used particularly for even distribution of fertilizer, seeds or the like.

In the copending application Serial No. 503,315, filed April 22, 1955, now Patent No. 2,801,772, a lawn spreader has been disclosed wherein the arrangement and disposition of the parts is such that when the shutter is closed, spring means retain the shutter in the closed position, while when the shutter is opened into any one of a plurality of open positions the same spring means retains the shutter in such open position, the size of the opening being determined by a setting of a cam or the like. These spring means are disposed in the structure disclosed in said copending application at one end of a rod, to assume the respective positions for closing and opening the shutter on either side of a deadcenter, a principle used before in lawn spreaders, as for instance shown in U. S. Patent 1,888,821 to Fearn.

It is one object of the present invention to provide a simplified structure wherein the spring means are disposed adjacent the hopper of the spreader device, which spring means operate the shutter in such manner to retain the same in its closed and a plurality of open positions, respectively, by passing a deadcenter between said positions.

It is another object of the present invention to provide a spreader device wherein a flange of the shutter closing and opening, respectively, the bottom opening of the hopper has secured thereto one end of a spring, the other end of the spring being secured to one wall of the hopper, in such manner that the spring retains the shutter in closed and a plurality of open positions, respectively.

It is still another object of the present invention to provide leg means for the spreader device which leg means are swingably mounted on the wheel axis and include means permitting a shifting of the leg members into a lowered operative position and a raised inoperative position, respectively.

With these and other objects in view which will become apparent in the following detailed description, the present invention will be clearly understood in connection with the accompanying drawings, in which:

Figure 1 is a rear elevation of the spreader device;

Fig. 2 is a section along the lines 2—2 of Fig. 1;

Fig. 3 is a section along the lines 3—3 of Fig. 1;

Fig. 4 is a section along the lines 4—4 of Fig. 1;

Fig. 5 is a fragmentary front elevation of the cam means for positioning the size of the spreader opening; and Fig. 6 is a fragmentary view of the shutter in relation to the hopper showing the respective operative positions.

Referring now to the drawings, the spreader comprises a hopper or receptacle 1 having end walls 2 and front and rear walls 3 and 4, respectively. The bottom 5 of the hopper 1 is formed of part circular shape and is equipped with one or a plurality of openings arranged crosswise along the hopper 1. An axle 6 finds its bearings in the end walls 2 and has mounted on the respective ends wheels 7 which are secured to the axle 6 in such manner that the axle 6 rotates together with the wheels 7 upon moving the spreader. The center portion of the axle 6 is preferably of square cross section and mounted on said portion of the axle 6 is an agitator 8 crosswise disposed inside of the hopper 1 and made of rubber, plastic or any other flexible material which has the properties of giving slightly upon applying sufficient pressure thereto. By this arrangement it is particularly possible to remove any particle which may become lodged between the agitator 8 and the front or rear walls 3 and 4, respectively, of the hopper 1 due to the yielding capacity of the material used for the agitator 8 and due to the possibility of removal of such particles in axial direction of said agitator 8.

A push bar 9, which is equipped with handle members 10 at its upper end and carries two laterally extending members 11, the lower ends of which are secured to the end walls 2 by means of screw bolts 12 or similar means, serves the purpose to move the spreader during operation thereof.

A shutter 13 is disposed at the bottom of the hopper 1, which shutter 13 is likewise of part circular shape complementary to that of the bottom portion of the hopper 1 and extends crosswise on the outside thereof and is adapted to assume either a position in which the opening or openings provided in the bottom portion of the hopper 1 are covered up, constituting the closing position of the shutter 13, or to assume any one of a plurality of open positions, the degree of exposing the openings being dependent upon a cam device to be described later.

The shutter 13 comprises an operative part circular portion 14 which is crosswise disposed below the bottom portion of the hopper 1, a downwardly projecting portion 15 which is also disposed crosswise along the hopper 1, preferably integral with the circular portion 14 and end flange portions 16 provided at the ends of the portion 15. A double-armed lever 17 is rotatably mounted upon the axle 6 and welded or secured by other suitable means to each of the end flange portions 16. A helical spring 18 is arranged between the free end of the lever 17 and the front wall 3 of the hopper 1, which spring 18 tends to turn the lever 17, in the view shown in Fig. 2 of the drawings, counterclockwise, so that the spring 18 tends to urge the shutter 13 into its rearmost position. An angle iron 19 is secured by welding or similar means to the rear face of the downwardly projecting portion 15 of the shutter 13, the rearwardly projecting arm of the angle iron 19 being equipped with an opening 20 which is adapted to receive the lower end of a connecting rod 21, the upper end of which is secured to an operating lever 22 mounted on a pivot 23 of a projection 24 of the push bar 9. The connecting rod 21 may be equipped with length adjusting means 25 of any conventional nature in order to permit proper original setting of the shutter 13. In order to move the shutter 13 from its closed position into any one of a plurality of open positions the active arm 26 of the operating lever 22 turns from a position of the operating lever 22 marked A in which the end of the operating lever 22 engages one of the handle members 10 and in which the active arm 26 forms an angle to the longitudinal axis of the connecting rod 21 into a position marked B and shown in dotted lines in which the longituinal axis of the active arm 26 coincides with the longitudinal axis of the connecting rod 21, during which movement the spring 18 is stressed, into an operative position of the operating lever 22 marked C and shown in point-dotted lines, in which the active arm 26 of the lever 22 forms again an angle towards the longitudinal axis of the connecting rod 21. It is thus readily seen that in order to shift the operating lever 22 from a shutter closing position to any one of a plurality of shutter opening positions, the arm 26 of the lever 22 must pass through a deadcenter whereupon the same spring 18 retains the shutter either in its closed position or in any one of the open positions.

As previously stated, the amount of opening of the shutter is determined by the position of a cam device. The same cam device disclosed in the copending patent application Serial No. 503,315, filed April 22, 1955 is used in the present spreader. This cam device is particularly clearly shown in Figs. 4 and 5 of the drawings. The cam device comprises a hollow preferably rectangular shaped body 27 which is secured to the rear wall 4 of the hopper 1 by means of screw bolts 28 or other suitable means. The body 27 has a recess 29 and a cylindrical flat member 30 is disposed on the outer face of the rectangular body 27 and secured thereto by a screw bolt 31 which is tightened to the body 27 by means of a wing nut 32. A second cylindrical flat member 33 is eccentrically disposed in the cylindrical flat member 30 and secured thereto either by welding or any other suitable means. A small helical spring 34 is disposed on the screw bolt 31, to maintain the respective members 30 and 33 in proper position relative to the body 27. A connecting rod 35 projects into the body 27 through a bottom opening 36 and the upper end of the connecting rod 35 is bent over for about 90° and projects into the second cylindrical flat member 33 to engage its inner cylindrical face. The connecting rod 35 leads downwardly and the lower end thereof is received by a second opening 37 provided in the angle iron 19 and is thus connected with the shutter 13. Since the shutter 13 in its opening position tends to move in rearward direction by the force of the spring 18 and simultaneously pushes the connecting rod 35 into its uppermost position, this upward movement of the connecting rod 35 finds an abutment at the inner cylindrical face of the second cylindrical flat member 33 and, depending upon the rotary motion of the first cylindrical flat member 30, the abutment position for the connecting rod 35 will be set at a higher or lower point, respectively, due to the eccentric position of the second cylindrical flat member 33 in the first cylindrical flat member 30. Upon operation of the hand lever from its shutter closing position A into its shutter opening position C, the location of the lever 22 in the position C will depend upon the setting of the cam device, thus permitting a faster or slower spreading of the material disposed in the hopper 1.

Since it is of importance to rest the hopper while filled with the spreader material in upright position, specially designed leg means are provided as particularly disclosed in Figs. 1 to 3. These leg means are of such construction that they permit of raising the same into an upper inoperative position and lowering the same into operative position, whereby spring means retain the leg means in either position. Thus, the leg means comprise two levers 38 which are pivoted upon the axle 6 and which may be formed of two separate pieces which are properly connected by screw bolts 39 or the like. A cross bar 40 connects the two levers 38 for joint swinging upon the axle 6 as axis of rotation. A member 41 of substantially U-shaped cross section is turnably mounted on the cross bar 40 and connected by means of pivots 42 with the second member 43 of substantially U-shaped cross section, the member 43 being of narrower width than that of the member 41, so that the former receives the lower portion of the latter in relative lowered position of the levers 38, which constitute the leg members. The rear base of the member 43 has secured thereto by welding or by other suitable means a handle plate 44, the lower end of which is slightly raised and inclined relative to the remaining portion of the handle plate 44. The raised lower portion of the handle plate 44 is adapted for shifting the leg means from their operative lowered position into inoperative raised position by gripping with one finger said raised portion of the handle plate 44, to move the member 43 and, thereby also the member 41 from the position shown in full lines in Fig. 3 in the direction of the arrow into the position shown in point-dotted lines in Fig. 3. The lower member 41 has secured to the innfer face of its base an angle iron 45 which is adapted to receive one end of a helical spring 46 to the other end of which is secured a pivot 47 attached by welding or the like to the rear wall 4 of the hopper 1, upon which pivot 47 the upper member 43 turns. The two members 41 and 43 are designed in such manner relative to each other and in relation to the position of the mounting of the spring 46 that in order to lift the levers 38 from an operative lowered position into their raised inoperative position, the spring 46 is stressed slightly before it can by contraction move the members 41 and 43 and, thereby, the levers 38 into their lifted positions.

While I have disclosed one embodiment of the present invention, it is to be understood that this embodiment is given by example only and not in a limiting sense, the scope of the present invention being determined by the objects and the claims.

I claim:

1. In a spreader, a hopper having at least one crosswise disposed discharge opening, the bottom of said hopper being of circular cross section, a shutter of a cross section complementary to that of the bottom of said hopper and movable along the outer face of said bottom in order to close said discharge opening in one position and to open said discharge opening in a plurality of other set positions of said shutter, and control means for said shutter movable on one side of a dead center position to a fixed position holding said cover member in closed position and movable to the other side of said dead center to a plurality of said set open positions, an axle extending through side walls of said hopper and having wheels at its respective ends secured thereto, and an agitator disposed adjacent said discharge opening and mounted on said axle, so that said agitator turns with said axle upon moving said spreader, a push rod secured to said hopper, and said control means comprising a control lever pivotally mounted on said push rod and rod means connecting said control lever with said shutter, and a rotary cam member and a lever, one end of said lever being connected with said shutter and the other end of said lever engaging said rotary cam, a double-armed lever pivotally mounted on said axle, one arm of said double-armed lever being secured to the end of said shutter, a helical spring, and the other arm of said double-armed lever being connected with one end of said helical spring, and the other end of the latter being connected with the corresponding side wall of said hopper, said springs maintaining said lever in continuous cam engaging position, independent from its adjusted position, in each of a plurality of open positions of said shutter on one side of dead center as well as in the closed position of said shutter on the other side of dead center.

2. The spreader, as set forth in claim 1, wherein said push rod has at least one handle projecting laterally from its upper end, and said control lever is pivoted on said push rod for rotary movement in a plane substantially perpendicular to said handle, and the latter forming an abutment for said control lever in the closed position of said shutter.

References Cited in the file of this patent

UNITED STATES PATENTS

| | | |
|---|---|---|
| 1,133,418 | White | Mar. 30, 1915 |
| 1,888,821 | Fearn | Nov. 22, 1932 |
| 2,225,157 | Court | Dec. 17, 1940 |
| 2,718,986 | Peoples | Sept. 27, 1955 |